United States Patent [19]

Scigalski

[11] 4,360,212
[45] Nov. 23, 1982

[54] OFFSET VEHICLE AXLE

[76] Inventor: Gilbert Scigalski, 7312 W. 80th St., Bridgeview, Ill. 60455

[21] Appl. No.: 199,652

[22] Filed: Oct. 22, 1980

[51] Int. Cl.³ .............................................. B60G 9/00
[52] U.S. Cl. .............................. 280/111; 280/112 R; 280/689
[58] Field of Search ................. 280/104, 80, 689, 688, 280/724, 711, 112 R, 112 A, 111; 301/127, 124 R, 1; 267/11 R, 11 A

[56] References Cited

U.S. PATENT DOCUMENTS

| | | | |
|---|---|---|---|
| 2,534,256 | 12/1950 | Fischer | 301/127 |
| 3,089,710 | 5/1963 | Fiala | 280/112 R |
| 3,608,925 | 9/1971 | Murphy | 280/112 R |
| 3,704,027 | 11/1972 | Laudadio | 280/112 A |
| 3,752,497 | 8/1973 | Enke et al. | 280/112 A |
| 3,778,081 | 12/1973 | Takahashi et al. | 280/112 A |
| 3,831,965 | 8/1974 | Dickens | 280/112 R |
| 3,980,317 | 9/1976 | Kolbe | 280/112 A |

OTHER PUBLICATIONS

"Design of Racing Sports Cars", by Colin Campbell (1973), pp. 66–69.

Primary Examiner—Robert R. Song
Attorney, Agent, or Firm—Hume, Clement, Brinks, Willian & Olds, Ltd.

[57] ABSTRACT

An improved axle for a vehicle maintains the wheels of the vehicle in a upright position when the wheels pass over irregularities in the surface of a road and holds the body of the vehicle in a fixed position with respect to the wheels when a lateral force such as a centrifugal force is applied to the body. The axle includes a shaft which supports the wheels of the vehicle and which pivots when the wheels roll over irregularities in the surface of a road. The shaft has two offset end portions which each support a wheel. The end portions are connected by a central bar which is pivotally and slidably supported so that the end portions move in arcuate paths when the shaft pivots. A wheel support assembly is provided for each end portion of the shaft to connect a wheel to the end portion and to change the arcuate movement of the end portion to a corresponding vertical movement of the wheel, so that the wheel is deflected in a vertical plane when it rolls over an irregularity of the surface. The wheel support assemblies also retain the shaft against lateral movement with respect to the body.

14 Claims, 9 Drawing Figures

OFFSET VEHICLE AXLE

BACKGROUND OF THE INVENTION

The invention relates to an improved axle for a vehicle and, more particularly, to an axle that enhances the traction of a vehicle by pivoting to deflect the wheels of the vehicle in a vertical plane when they roll over irregularities in the surface of a road. The invention further relates to an improved axle that prevents the body of a vehicle from leaning when the vehicle is turned.

In a conventional vehicle, for example an automobile, springs resiliently suspend the body of the vehicle over the wheels. When the wheels pass over bumps or other irregularities of a road, the springs absorb the resulting impact energy and thereby provide a relatively smooth ride. When the vehicle is turned, a centrifugal side-force causes the resiliently supported body to lean outwardly so that the center of gravity of the vehicle is shifted from its normal or rest position and the vehicle has a tendency to skid or roll. If the lean of the body is reduced by stiffening the supporting springs, road shocks are more readily transmitted to the body and the ride of the vehicle is less comfortable.

Moreover, when a vehicle with a conventional axle rolls over irregularities of a road, the wheels of the vehicle are bounced and laterally deflected so that the camber of the wheels is intermittently changed and the traction of the wheels is correspondingly reduced. Of course, the reduced traction makes it more difficult to control the vehicle. Thus, if the vehicle is turning when the wheels are laterally deflected, it is more likely that the centrifugal force of the turn and the resulting lean of the body will cause the vehicle to skid or roll.

Various systems have been devised to avoid the above-indicated undesirable effects of the centrifugal turning force. However, such prior art systems have employed relatively complex and/or bulky apparatus or have used apparatus that consumes the power of the vehicle.

Accordingly, it is an object of the invention to provide a simple and effective offset axle that will allow the body of a vehicle to be resiliently suspended for a comfortable ride and that will also prevent the body of the vehicle from leaning when the vehicle turns.

A further object of the invention is to provide an offset axle that will avoid undesirable changes in the camber of a wheel by deflecting the wheel in a vertical plane when the wheel rolls over bumps or other irregularities in the surface of a road.

BRIEF SUMMARY OF THE INVENTION

In order to achieve the objects of the invention and to overcome the problems of the prior art, the improved offset axle of the invention is employed to support at least two of the wheels of a vehicle in an upright position for deflection in a vertical plane with respect to an associated road surface. The offset axle also operates to resist the lateral movement of the body of a vehicle with respect to the supported wheels of the vehicle.

The offset axle includes a shaft that supports at least two wheels and that pivots when the wheels roll over irregularities in the surface of a road. The shaft has parallel first and second end portions that lie along different lines in a common plane and a center portion which is provided to connect the end portions.

A shaft support assembly is provided to slidably and pivotally support the shaft with respect to the body of the vehicle so that the wheels will be deflected in a vertical plane when they roll over irregularities in the surface of a road. Also, the shaft support assembly prevents the body from moving laterally with respect to the wheels when the vehicle is turned.

In one embodiment of the invention, the shaft support assembly includes two axle guide plates which are connected to the body of the vehicle and which extend vertically downwardly in a parallel spaced relation to define a guide channel. The center portion of the shaft is slidably engaged with the guide channel of the axle guide plates and thereby slidably and pivotally supports the first and second end portions of the shaft so that the end portions move in arcuate paths as the shaft pivots.

The shaft support assembly also includes a wheel support assembly for each end portion of the offset axle. Each wheel support assembly is employed to translate arcuate pivotal movement of an end portion of the shaft to vertical movement of a wheel. Each wheel assembly includes a pair of wheel guide plates that are connected to the body and that extend vertically in a spaced, parallel relation. The guide plates define a wheel guide channel. Each wheel support assembly also includes a wheel guide rail which has an extending first leg for slidably engaging the wheel guide plates in the wheel guide channel and a second leg that is substantially perpendicular to the first leg and that has a slot disposed in its free end. An extending shaft is provided at the the first leg to rotatably support at least one associated wheel. A coupling member is pivotally connected at one end to the free end of its associated end portion of the shaft and is slidably engaged at its opposite end in the slot of the second leg.

When a wheel hits an irregularity in the surface of a road, the center portion of the shaft pivots within the axle guide plates. The pivoting movement of the center portion causes the end portion associated with the deflected wheel to move in an arc in a vertical plane and to rotate slightly at its pivotal connection with the coupling member. The arcuate movement of the end portion of the shaft causes the coupling member to be moved in an axial direction with respect to the slot in the end of the second leg of the wheel guide rail.

The axial movement of the coupling member and the associated arcuate movement of the end portion of the shaft causes the first leg of the guide rail to be moved in a vertical direction within the confines of the wheel guide plates. Since the wheel is connected to the first leg of the wheel guide rail, the wheel moves vertically with the guide rail. Thus, the arcuate movement of the end portion of the shaft is translated to a vertical movement of the associated wheel.

The wheels of the vehicle and the body of the vehicle are maintained in alignment against lateral forces by the engagement of the center portion of the shaft with the axle guide plates.

In a preferred embodiment of the invention, the center portion of the shaft extends diagonally to connect the end portions of the shaft. The axle guide plates are not required in the preferred embodiment, since the wheel guide plates provide the necessary slidable and lateral support for the shaft.

DETAILED DESCRIPTION OF PREFERRED EMBODIMENTS

Figure 1:
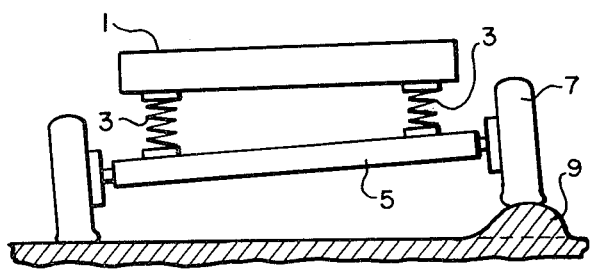
FIG. 1 shows a diagrammatic rear elevation view of a prior art wheel displacement apparatus.

The remaining portion of this specification will describe preferred embodiments of the invention when read in conjunction with the attached drawings, in which like reference characters designate identical apparatus.

FIG. 1 shows a diagrammatic rear elevation view of a prior art suspension apparatus for a vehicle. The vehicle includes a body 1 that is resiliently supported by springs 3 with respect to an axle 5. As shown in FIG. 1, when a wheel 7 of the prior art vehicle rolls over a raised surface 9, the wheel 7 is deflected upwardly and laterally outwardly and the camber of the wheel is thereby momentarily changed. Since the wheel 7 is deflected laterally, a portion of the wheel momentarily moves out of contact with the surface of the road and, therefore, the traction of the vehicle is decreased. If the vehicle is moving on a relatively slippery surface, for example a wet road, the momentary loss of traction could result in a dangerous skid. Also, if the vehicle is turning, the centrifugal force associated with the turn could cause the vehicle to skid, since the wheel 7 is not in full contact with the road.

Figure 2:
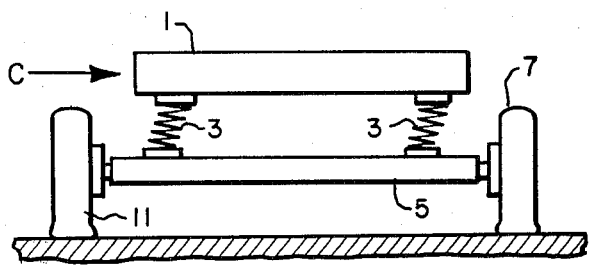
FIG. 2 shows a diagrammatic rear elevation view of a prior art vehicle suspension apparatus.

FIG. 2 illustrates the operation of the prior art vehicle suspension apparatus of FIG. 1, when the vehicle makes a left turn. The centrifugal force C of the turn causes the body 1 to shift or lean with respect to the associated wheels and independent suspension axle 5. The shift in the position of the body 1 causes the center of gravity of the body to shift, thereby making it easier for the body to tip or roll. Moreover, if the inner wheel 11 of the vehicle is deflected, for example by a raised surface in the road, the loss of traction at the wheel, in conjunction with the affects of the centrifugal force and the leaning of the body, could cause the vehicle to tip or roll or to skid out of control.

Figure 3A:
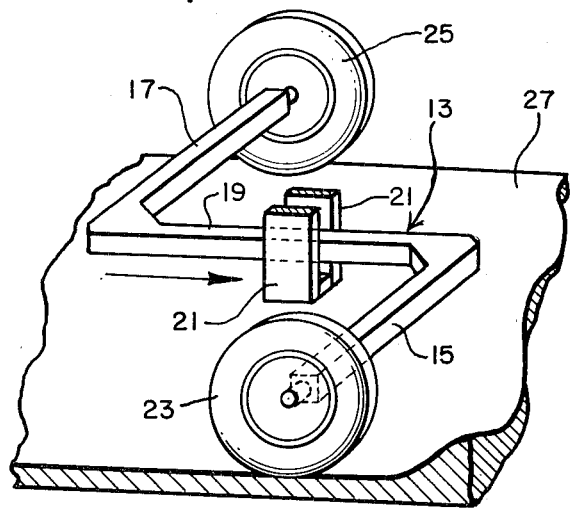
FIG. 3a shows a diagrammatic perspective view of the offset axle of an embodiment of the invention operating with no deflection of the wheels of a vehicle.

FIG. 3a is a diagrammatic perspective view of an offset axle 13 that may be employed to avoid the above-indicated problems of the prior art suspension apparatus. For the sake of clarity, the body of the vehicle of FIG. 3a is not shown. The pivoting axle 13 includes a front extending arm portion 15, a rear extending arm portion 17 and a connecting center slide portion 19. The slide portion 19 is slidably engaged with two parallel axle guide plates 21 that are affixed to the frame or body of the vehicle (not shown). The guide plates 21 and center slide portion 19 are dimensioned to allow the slide portion to pivot between the plates or to move up and down or forwards and backwards. When the vehicle of FIG. 3a is moving over a relatively smooth surface, the axle 13 is positioned in an essentially horizontal plane and is resiliently suspended from the frame of the vehicle, for example by springs (not shown). The extending arm portions 15 and 17 are respectively rotatably connected to wheels 23 and 25 that roll over the surface of a road 27.

Figure 3B:
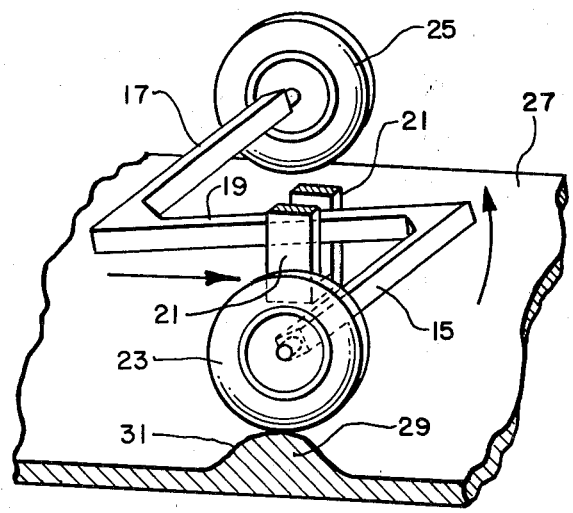
FIG. 3b shows a diagrammatic perspective view of the offset axle of FIG. 3a when a wheel is deflected in a vertical plane.

FIG. 3b illustrates the movement of the pivoting axle 13 when the wheel 23 rolls over a raised area 29 of the road 27. As the front edge of the wheel 23 hits the forward edge 31 of the raised area 29, the wheel 23 is caused to move upwardly in an arc by the pivoting movement of the center slide portion 19 with respect to the guide plates 21. Of course, when the wheel 23 has passed over the raised area 29, the pivoting axle 13 returns to its horizontal position.

Figure 4:
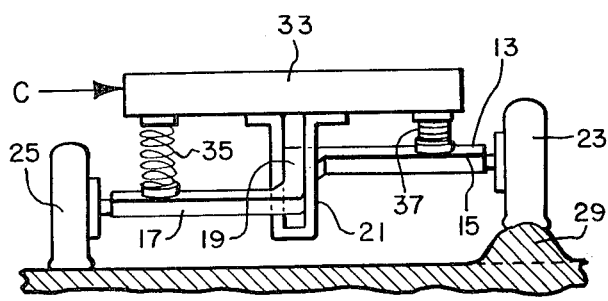
FIG. 4 shows a diagrammatic rear elevation view of a vehicle, in accordance with the invention, when a wheel is deflected in a vertical plane.

FIG. 4 shows a diagrammatic rear elevation view of the pivoting axle of FIGS. 3a and 3b as the wheel 23 passes over the raised area 29. FIG. 4 also shows the positioning of the pivoting axle 13 with respect to a vehicle body 33 and resilient supporting springs 35 and 37. As shown in FIG. 4, when the wheel 23 passes over the raised area 29, the extending arm portion 15 of the pivoting axle 13 is momentarily pivoted upwardly to compress the supporting spring 37 and to thereby cause the wheel 23 to move in an arc away from the raised portion 29. It should be appreciated that the axle 13 of FIG. 4 pivots about a point defined at the rotatable connection between the rear extending arm 17 and its associated wheel 25. Likewise, if the wheel 25 passes over a raised area of the road 27, the arm 17 will pivot about a point defined at the rotatable connection between the wheel 23 and the forward arm 15 so that the wheel 25 will be moved in a forward arc in the direction of the raised area.

If the wheels 23 and 25 simultaneously pass over raised portions of the road 27, the axle 13 will slide upwardly with respect to the guide plates 21 and will also pivot if the raised portions are of different size. Of course, if either or both wheels of the vehicle passes through a depression in the road, the axle 13 will be caused to pivot or slide so that the wheels are maintained in a vertically upright position with respect to the surface of the road.

Since the movement of the axle 13 maintains the wheels 23 and 25 in an upright position with respect to the road 27 as the wheels pass over irregularities in the road, the camber of the wheel does not change when the wheels encounter irregularities and therefore, the traction of the vehicle is enhanced. It should also be understood that the vehicle body 33 does not lean when subjected to a lateral force, for example centrifugal force C, since the center slide portion 19 of the axle is restrained from lateral movement by the guide plates 21. Thus, as the vehicle of FIG. 4 turns, the wheels 23 and 25 are maintained in upright contact with the road to provide maximum traction and the body 33 is held in alignment with the wheels 23 and 25. It will be appreciated by those skilled in the art that relatively "soft" springs 37 and 35 may be employed to provide a comfortable ride, since the springs are not required to resist lateral centrifugal forces.

Although a simple axle may be constructed in accordance with the principles outlined with respect to FIGS. 3a, 3b and 4, such an axle might provide an uneven ride, since the leading wheel of the axle would be moved to pivot away from irregularities in the road, while the trailing wheel of the axle would be pivoted to move into irregularities. Also, the center slide portion 19 of the axle would be free to move forwardly or rearwardly with respect to the guide plates 21 and such movement might interfere with the smooth pivotal operation of the axle. In addition, it is preferred to position the wheels of an axle opposite one another rather than in an offset relation.

Figure 5:
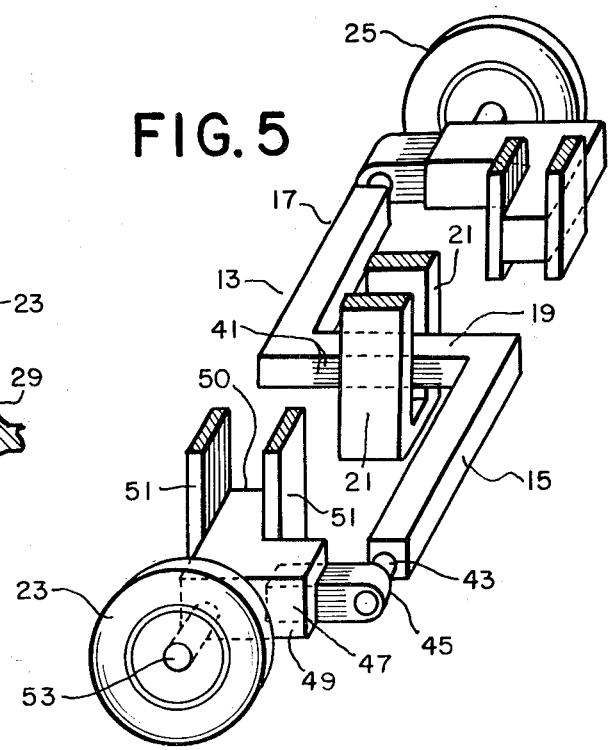
FIG. 5 is a perspective view of an offset axle, in accordance with the invention.

Accordingly, FIG. 5 illustrates a perspective view of an embodiment of an offset axle that solves the indicated problems associated with the above-described simple offset axle. For simplicity, the body of the vehicle has not been shown in FIG. 5. However, as indicated above, axle guide plates 21 are either affixed to the body or formed on the body to provide a rigid support structure. The downwardly extending ends of the axle guide plates 21 are connected, for example by a stop member 39, so that the center slide portion 19 of the axle 13 is retained between the plates. As indicated above, the center slide portion 19 is dimensioned to pivot or slide between the plates 21. It should be appreciated that the dimensional tolerance of the center slide portion 19 and plates 21 is such that the slide portion is allowed to smoothly pivot or slide, without binding or wobbling.

For a preferred embodiment of the invention, the center slide portion 19 and/or the plates 21 may be provided with a plurality of grooves 41 in order to reduce the surface area of contact between the slide portion and the plates and to thereby facilitate the pivoting and sliding of the slide portion. Also, a grease or other lubricant may be provided to reduce the friction between the center slide portion 19 and the plates 21. It should be understood that other means known to the art may be employed to provide a smooth pivotal and sliding contact between the center slide portion 19 and the guide plates 21, without departing from the invention. For example, bearings may be disposed between the plates and the slide portion to facilitate the sliding and pivotal movement.

The front and rear extending arms 15 and 17 are shown in FIG. 5 as integral portions of a single axle. However, it should be appreciated that the arms 15 and 17 may be separate pieces connected to the center slide portion 19 in any manner known to the art. In addition, although the arm portions 15 and 17 of FIG. 5 are shown with a rectangular cross-section, other cross-sectional shapes may be employed without departing from the spirit of the invention.

The center slide portion 19 is shown with a rectangular cross-section and with corresponding flat faces that are suitable for retention by the flat inner surfaces of the plates 21 in pivotal and sliding relation. However, the abutting surfaces of the center slide portion 19 and the guide plates 21 may be shaped in any fashion known to the art, so long as the center slide portion 19 is retained against lateral movement and is allowed to slide and pivot in the required manner.

At the free end of the front extending arm portion 15 is a shaft 43 that is dimensioned to pivotally engage a bearing at one end of a coupling member 45. The other end of the coupling member 45 is inserted into a corresponding slot 47 that is disposed in the end of an extending leg of a wheel guide rail 49. The slot is dimensioned so that the coupling member may move axially within the leg. Another extending leg 50 of the wheel guide rail 49 is engaged between two parallel wheel guide plates 51. The guide plates and the abutting extending leg 50 of the wheel guide rail 49 are dimensioned so that the leg is retained against lateral horizontal motion, but may move vertically or axially. A shaft 53 is supported on the wheel guide rail 49 and is employed to rotatably support a corresponding wheel 23. The wheel 25 is supported adjacent to the free end of the rear extending arm 17 by a similar support apparatus.

In operation, the connecting center slide portion 19 pivots and slides in the above-described manner as the wheels 23 and 25 pass over irregularities in the surface of a road. As the center slide portion 19 pivots, the free ends of the arms 15 and 17 of the axle travel over arcuate paths. Thus, if the center slide portion 19 pivots the arm 15 upwardly, the shaft 43 at the free end of the arm rotates in the bearing of the coupling member 45 and moves in an upward arcuate path to push the coupling member 45 inwardly and upwardly. The outward pull on the coupling member 45 causes the member to slide partially into the slot 47 and, as the coupling member 45 is moved upwardly by the shaft 43, the wheel guide rail 49 is caused to move a corresponding vertical distance and the associated wheel 23 is likewise caused to move upwardly over the indicated vertical distance.

It should be understood that the preferred embodiment of the axle of FIG. 5 operates to translate the arcuate movement of either of the arms 15 and 17 to a corresponding vertical movement of an associated wheel. Accordingly, the opposite wheels 23 and 25 of the shaft move vertically and uniformly as the wheels pass over irregularities in the road. It should be appreciated that the sliding portion of the coupling member 45, the slot 47, the wheel guide plates 51 or the extending leg 50 of the wheel guide rail 49 may be grooved, as is the center slide portion 19. Of course, as indicated above, any means known to the art may be employed to facilitate the sliding of the members and the sliding surfaces may be dimensioned or shaped in any fashion known to the art to facilitate the described sliding motion, without departing from the spirit of the invention.

It should be appreciated that the preferred embodiment of the pivoting axle of FIG. 5 provides a structure whereby the wheels of the axle may be positioned opposite one another. Also, the forward and backward movement of the center slide portion 19 is controlled within the limits defined by the positioning of the wheel guide plates 51 and the dimensioning of the slots 47 of the respective wheel assemblies. Moreover, it should be appreciated that, since the wheels are constrained to move vertically by the wheel guide plates 51, each wheel will respond uniformly to a particular irregularity in the surface of the road and therefore, the ride of a vehicle employing the axle of FIG. 5 will be relatively even.

Figure 6:
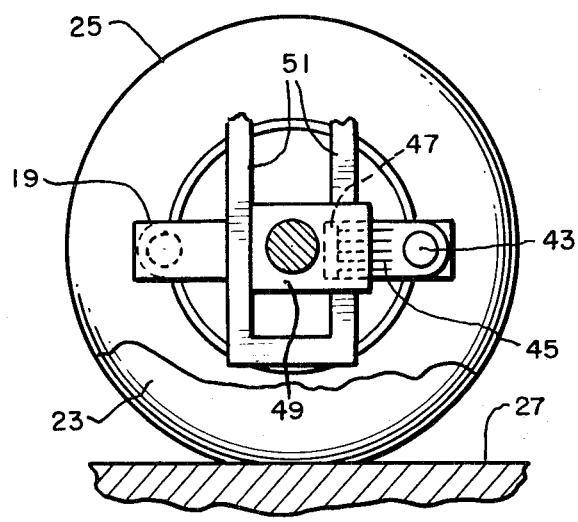
FIG. 6 is a side elevation view of a wheel assembly of the apparatus of FIG. 5, when the associated wheel is not deflected.
Figure 7:
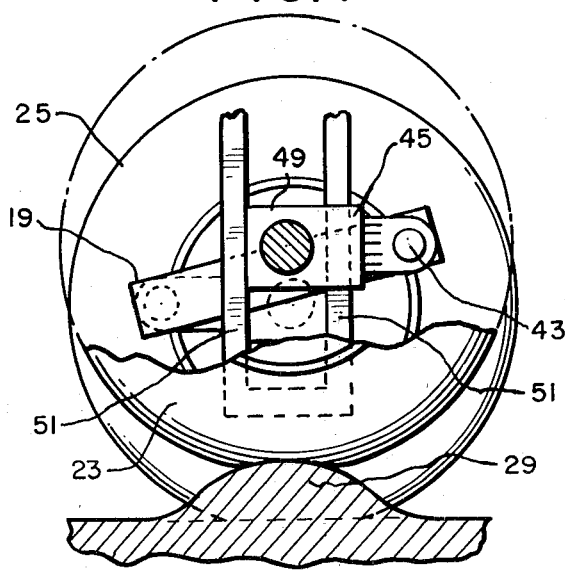
FIG. 7 is a side elevation view of a wheel assembly of the apparatus of FIG. 5, when the associated wheel is deflected.

FIGS. 6 and 7 are provided to illustrate the movement of the wheel guide rail 49 in relation to the wheel guide plates 51 when the wheel 23 passes over a raised portion of the road 27. As shown in FIG. 6, when the wheel 23 is moving over a relatively smooth surface, the center slide portion 19 is positioned in a horizontal plane and the coupling member 45 rests at a particular position within the slot 47. However, when the wheel 23 passes over a raised area 29 of the road, the center slide portion 19 pivots upwardly, the shaft 43 rotates slightly within the bearing of the coupling member 45, and the wheel guide rail 49 moves the wheel 23 vertically and upwardly.

Figure 8:
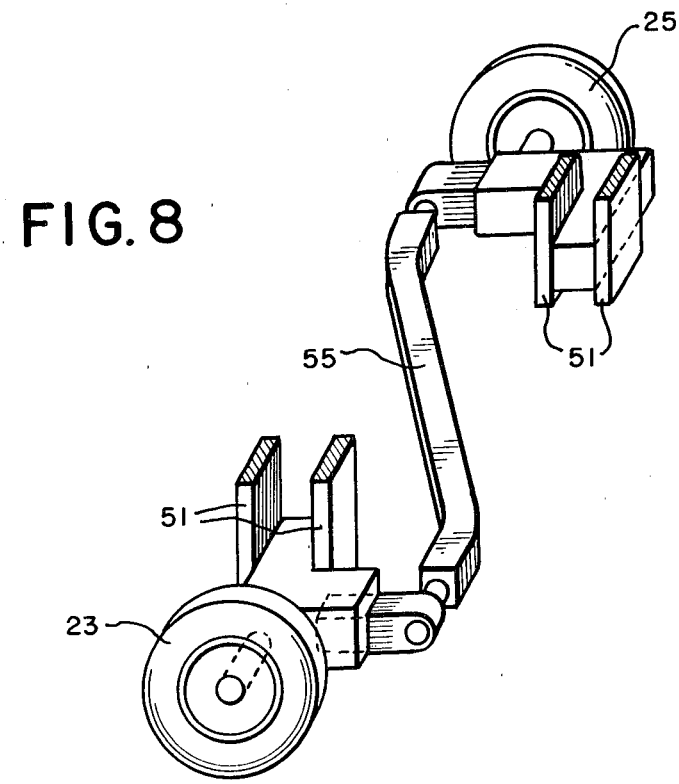
FIG. 8 is a perspective view of a preferred embodiment of the offset axle of the invention.

FIG. 8 illustrates a perspective view of a preferred embodiment of an offset axle wherein a relatively simple diagonal shaft 55 is used in place of the arms 15 and 17 and slide portion 19 of FIG. 5. The shaft 55 pivots when the wheels 23 and 25 roll over irregularities in the surface of a road and the pivotal movement is translated into vertical displacement in the manner described for the embodiment of FIG. 5. The member 55 does not require guide plates corresponding to the plates 21 of FIG. 5, since the wheel guide plates 51 of the wheel assemblies of FIG. 8 are sufficient to properly constrain the movement of the member 55.

The offset axles of FIGS. 5 and 8 may be employed to support the front wheels of a vehicle, if known turning mechanisms (not shown) are connected to the spindles or shafts of the wheels and engaged with the wheels in a manner known to the art.

The invention may be embodied in other specific forms without departing from its spirit or essential characteristics. The present embodiments are, therefore, to be considered in all respects as illustrative and not restrictive, the scope of the invention being indicated by the claims rather than by the foregoing description. All changes which come within the meaning and range of the equivalents of the claims are, therefore, intended to be embraced therein.

I claim:

1. In a vehicle having a body and wheels for rolling over a surface, the improvement of an offset axle, comprising:

shaft means for connecting at least two wheels and for pivoting when the wheels roll over irregularities of said surface, said shaft means including parallel and offset first and second end portions and a center portion for connecting the end portions; and support means for blocking lateral movement of said shaft means with respect to said body and for allowing said shaft means to pivot and move vertically with respect to the body so that the wheels are independently deflected in respective vertical planes when they roll over irregularities of said surface.

2. The offset axle of claim 1 wherein said support means includes two axle guide plates supported on said body and extending vertically downwardly in parallel spaced relation for defining a guide channel, and said center portion of the shaft means includes means for pivotally and slidably engaging the guide plates in the guide channel.

3. The offset axle of claim 2 wherein said means for pivotally and slidably engaging includes grooves formed in a sliding surface of the center portion of said shaft means.

4. The offset axle of claim 1 wherein said support means includes a wheel support assembly for said first end portion of the shaft means and a wheel support assembly for said second end portion of the shaft means, each wheel support assembly including:

two wheel guide plates supported on the body and extending vertically in spaced parallel relation for defining a wheel guide channel;

a wheel guide member having a first extending leg with means for slidably engaging said wheel guide plates in said wheel guide channel and a second leg substantially perpendicular to the first leg and having a slot disposed in its free end;

means for rotatably connecting said wheel guide member and at least one wheel; and coupling means for pivotally connecting at one end to its associated end portion of the shaft means and including means at its opposite end for slidably engaging said second leg for axial movement within the slot of the second leg.

5. The offset axle of claim 4 wherein said means for slidably engaging the wheel guide plates includes grooves formed in a sliding surface of said first extending leg, and said means for slidably engaging the second leg includes grooves formed in a sliding surface of said opposite end of the coupling means.

6. The offset axle of claim 1 further including means for resiliently supporting said body with respect to the wheels of said shaft means.

7. The offset axle of claim 1 wherein said center portion is substantially perpendicular to said end portions.

8. The offset axle of claim 1 wherein said center portion of said shaft means is a bar having a rectangular cross-section.

9. In a vehicle having a body and wheels for rolling over a surface, the improvement of an offset axle, comprising:

shaft means for supporting at least two wheels and for pivoting when the wheels roll over irregularities in said surface, said shaft means including a first end portion adjacent to and supporting at least one wheel, a second end portion offset with respect to the first end portion and positioned adjacent to and supporting at least one other wheel, and means for moving each of the end portions in an arcuate path when its associated wheel rolls over an irregularity of said surface and pivots the shaft means; and wheel support means for connecting each wheel with its adjacent end portion of said shaft means and for changing the arcuate movement of the end portion to a corresponding vertical movement of the wheel so that the wheel is deflected vertically in a vertical plane when it rolls over an irregularity of said surface.

10. The offset axle of claim 9 wherein said means for moving each of the end portions includes a bar for connecting said end portions and shaft support means for pivotally and slidably supporting said bar and for retaining said bar against lateral movement with respect to said body.

11. The offset axle of claim 9 wherein said means for moving each of the end portions includes a bar for connecting the end portions, the bar being retained by said wheel support means against lateral movement with respect to said body.

12. In a vehicle having a body and wheels for rolling over a surface, the improvement of an offset axle, comprising:

shaft means for connecting at least two wheels and for pivoting when the wheels roll over irregularities of said surface, said shaft means including parallel and offset first and second end portions and a center portion for connecting the end portions; and support means of said body, said support means including two axle guide plates extending vertically downwardly from the body in parallel spaced relation for defining a guide channel, said center portion of the shaft means including means for pivotally and slidably engaging said guide plates in said guide channel to block lateral movement of the shaft means with respect to the body and to allow the wheels to be independently deflected in respective vertical planes when they roll over irregularities of said surface.

13. In a vehicle having a body and wheels for rolling over a surface, the improvement of an offset axle, comprising:
   shaft means for connecting at least two wheels and for pivoting when the wheels roll over irregularities of said surface, said shaft means including parallel and offset first and second end portions and a center portion for connecting the end portions; and
   support means for blocking lateral movement of said shaft means with respect to said body to resist leaning of the body and for pivotally engaging the end portions of the shaft means and rotatively supporting said wheels in coaxial alignment, said support means having means for moving the shaft means with respect to the body to deflect the wheels in vertical planes and to avoid transmitting the shock of the wheel deflections to the body when the wheels roll over irregularities of said surface.

14. In a vehicle having a body and wheels for rolling over a surface, the improvement of an offset axle for connecting the wheels and resisting leaning of the body and tilting of the wheels, comprising:
   shaft means having offset end portions; and
   support means for pivotally engaging the end portions and rotatively supporting the wheels in coaxial alignment, said support means having means for allowing pivotal, vertical, forward and backward movement of the shaft means to independently deflect the wheels in respective vertical planes and to avoid transmitting the shock of the wheel deflections to the body when the wheels roll over irregularities of said surface.

* * * * *